R. W. SNYDER.
APPARATUS FOR BUILDING TIRES OF THE SOLID TYPE.
APPLICATION FILED OCT. 3, 1918.
1,415,842.
Patented May 9, 1922.
2 SHEETS—SHEET 2.
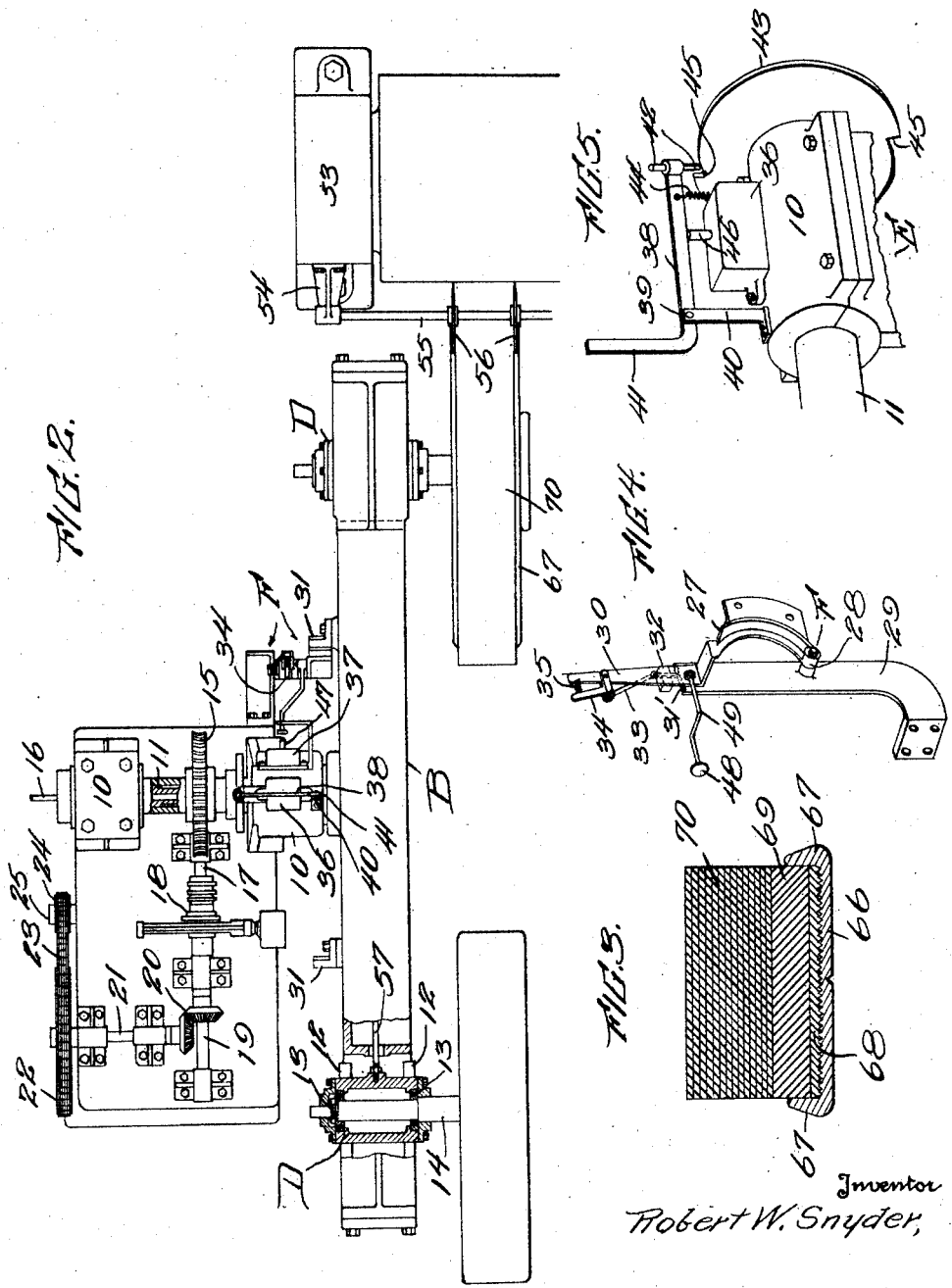

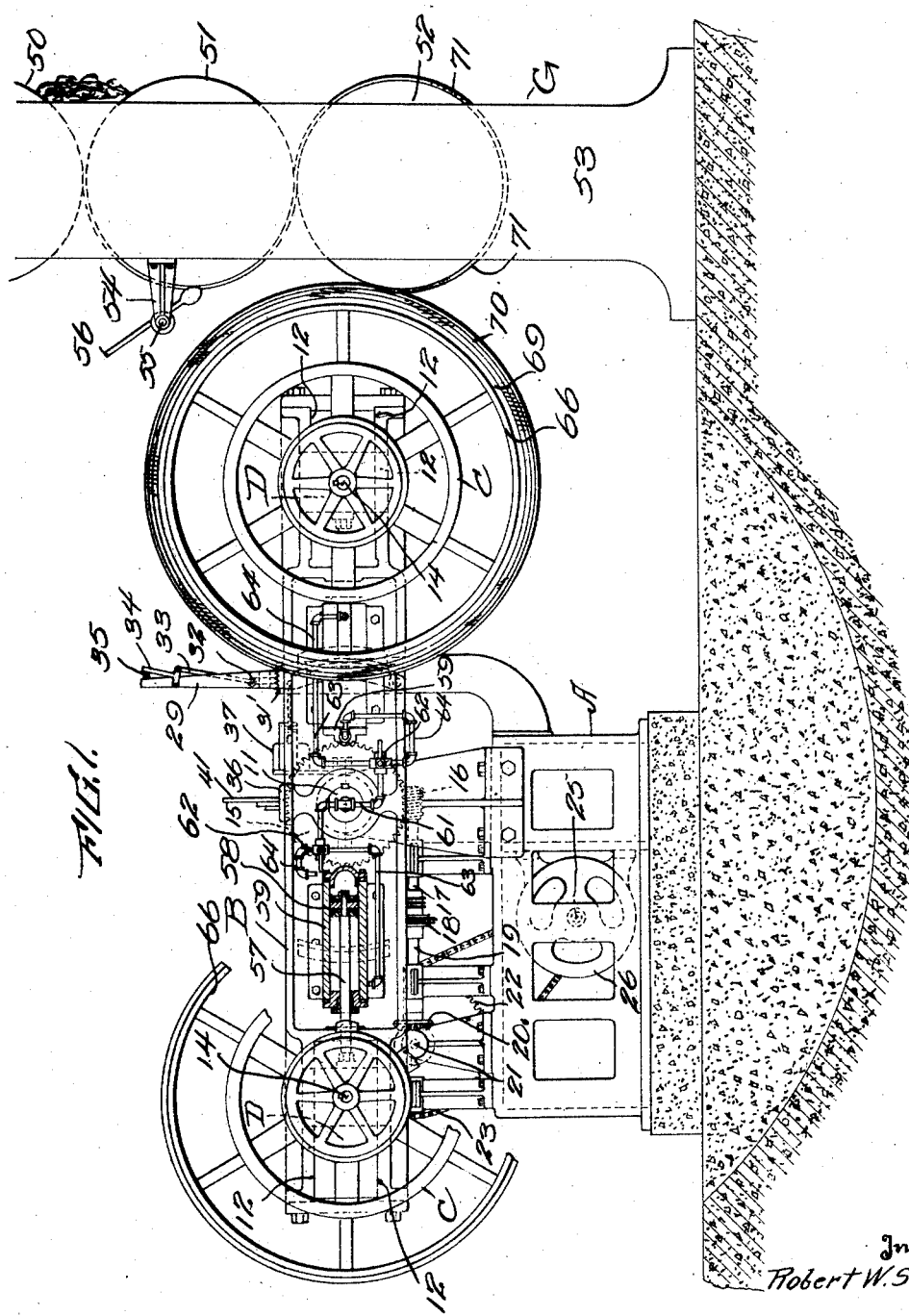

UNITED STATES PATENT OFFICE.

ROBERT W. SNYDER, OF AKRON, OHIO, ASSIGNOR TO THE GOODYEAR TIRE & RUBBER COMPANY, OF AKRON, OHIO, A CORPORATION OF OHIO.

APPARATUS FOR BUILDING TIRES OF THE SOLID TYPE.

1,415,842.  Specification of Letters Patent.  Patented May 9, 1922.

Application filed October 3, 1918. Serial No. 256,689.

*To all whom it may concern:*

Be it known that I, ROBERT W. SNYDER, a citizen of the United States, and resident of Akron, Ohio, have invented new and useful Improvements in Apparatus for Building Tires of the Solid Type, of which the following is a specification.

My present invention relates to constructing solid rubber tires, and its principal object is to provide an apparatus for forming the tread portion of the solid tire by means of a strip of rubber material wound on the base portion of the tire to build up the tread portion.

Another object of the invention is to provide an apparatus of the character specified, in which the unfinished tire is placed in frictional contact with a roll of a calender and the strip of rubber material formed by the calender is taken directly therefrom and wound on the unfinished tire by rotation of the latter by the calender roll.

Another object is to provide means in the apparatus for adjusting toward or away from the calender roll a chuck carrying the unfinished tire, and for yieldingly holding the unfinished tire in frictional contact with the calender roll by fluid under pressure.

A still further object of the invention is to provide a construction in which a plurality of the chucks are arranged on a rotatably mounted frame or beam so that they can be successively brought into operative relation with the roll of the calender.

The above and additional objects of a similar nature may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention, and throughout the several views of which similar referenece characters designate like parts:

Figure 1 is a side elevational view of the apparatus, with some parts broken away and other parts shown in section;

Figure 2 is a plan view, partly in section, of the apparatus;

Figure 3 is a cross sectional view of the solid tire;

Figure 4 is a fragmentary perspective view of means for locking the chuck carrying frame; and Figure 5 is a fragmentary perspective view of means for controlling the operation of the chuck carrying frame.

In the drawings, A designates the supporting frame of the apparatus; B designates a beam or frame which is rotatably mounted on the supporting frame A; C designates the chucks which are adjustably mounted on the beam B; D designates slidable supports for the bearings of the chucks, which supports are operated by fluid under pressure; E designates means for controlling the operation of the beam B; F designates means for locking the beam B in adjusted position; and G designates a calender.

The supporting frame A has thereon bearings 10 for a shaft 11 to one end portion of which is secured the central portion of the beam B.

The beam B has at its ends slides 12 on which are mounted the hollow supports D for the bearings 13 of the shaft 14 carrying the chucks C. The latter may be of the usual or any approved construction. The shaft 11 may be driven by any suitable means, that shown consisting of a worm wheel 15 which is in mesh with a worm 16 on a shaft 17 operatively connected to a magnetic clutch 18, to which in turn is connected a shaft 19 connected by bevel gearing 20 to a shaft 21 having thereon a sprocket wheel 22, around which a sprocket chain 23 passes which chain also engages a sprocket 24. The sprocket pinion 24 is secured to the shaft 25 of an electric motor 26, preferably carried upon the supporting frame A.

The means F for locking the beam B in adjusted position preferably consist of a curved shoe 27 mounted on a pivot 28 in an arm 29 and adapted to be moved by means of an offset handle 30 into or out of engagement with curved projecting parts 31 on the beam B. The arm 29 has its lower end rigidly secured to the supporting frame A, and has cut in its upper end notches 31 adapted to be engaged by a dog 32 which is slidably mounted on the handle 30. The dog 32 is pivotally connected to one end of a link 33 which has its other end pivotally connected to an angular lever 34 which latter is pivotally mounted at the upper end of the handle 30. A spring 35 is interposed between the angular lever 34 and the handle 30 and is adapted to normally hold the dog 32 in engagement with the notches 31 and thus lock the arm 30 in adjusted position, as will be understood.

The means E for controlling the operation of the beam B preferably consists of switches which are arranged in boxes 36 and 37 and mounted on one of the bearings 10, and which switches are connected to each other and to the magnetic clutch 18 by suitable conductors, not shown. The switch in the box 36 is controlled by and is connected to a pivotally mounted lever 38, and the switch in the box 37 is closed by suitable means when the curved shoe 27 is moved away from one of the parts 31 to unlock the beam B. The lever 38 is mounted on a pivot 39 at the upper part of a support 40 arranged adjacent to the box 36, and it is provided with a handle 41 at one end and has at the other end a finger 42 adapted to bear against the peripheral cam surface on a disk 43 which is mounted on shaft 11. A spring 44 is connected to the bearing 10 and to the lever 38, to normally hold the finger 42 in contact with the cam disk 43. When the finger 42 is disposed in the indented portion 45 of the disk 43, (see Figure 5), the projection 46 on one of the elements of the switch in the box 36 is moved downwardly so that such switch is in open condition.

The switch elements in the box 37 has thereon a projection 47 which, when the handle 30 is operated to move the curved shoe 27 away from the part 31, (see Figure 2), is adapted to be moved inwardly to close the switch by engagement therewith of a button 48 on an angular arm 49 attached to the handle 30.

The calender G as used in connection with our apparatus may be of the usual or any approved construction, and it comprises the rolls 50, 51 and 52 mounted on side supports 53. On supporting brackets 54 attached to the side supports 53 is mounted a rod 55 on which is adjustably arranged the bars 56 provided at their lower ends with cutting edges in contact with the roll 51.

The hollow supports D for the bearings of the chucks C are connected by rods 57 to pistons 58 in cylinders 59 arranged on the beam B. A pipe 60 for supplying air under pressure passes freely through the hollow shaft 11 and is connected by piping 61 to valves 62, which are connected by piping 63 and 64 to the ends of the cylinders 59. The supports D, and consequently the chucks C, can be moved either outwardly or inwardly of the beam B by manipulation of the handles 65 to operate the valves 62 to admit fluid under pressure to the cylinders 59 to move the pistons 58. When compressed air is passed through the piping 63 to either of the cylinders 59, the piston in the cylinder is moved outwardly of the beam B and air is exhausted from the cylinder through the piping 64 and the valve 62 which was operated to pass the compressed air through the piping 63; and when the valve is operated to pass the compressed air to the cylinder through the piping 64, the piston is moved inwardly of the beam B and air is exhausted from the cylinder through the piping 63 and the valve.

The base portion of the solid tire consists of a steel ring 66, having outwardly extending flanges 67 at its sides, a layer of hard rubber material 68 in the channel of the ring 66, and a layer of rubber material 69 which extends beyond the outer edges of the flanges 67 and which, when vulcanized, has a degree of hardness between that of the inner layer 68 and the tread portion 70, and acts as a bond between the layer of material 68 and the tread portion 70.

From the foregoing it will be seen that a treaded tire on the chuck C remote from the calender G can be replaced by an untreaded tire while the tread of the tire on the other chuck C is being built up. By admitting compressed air to the cylinder 59 the base portion of the tire on one of the chucks C can be moved to make yielding (air cushioned) frictional contact with the roll 52 and be rotated by the latter to wind on the base portion of the tire a strip 71 of rubber material which is formed by the calender G. When the tread portion of the tire has been formed by the strip 71 of material which is wound on the tire under pressure by the roll 52, the chuck C with the tire thereon can be moved away from the roll 52 by means of the pistons; and the handle 30 can be operated to move the shoe 27 to unlock the beam B and close the switch in the box 37, whereupon the handle 41 can be operated to raise the finger 42 out of the indented portion 45 of the cam disk 43, thereby closing the switch in the box 36, which in turn closes the circuit to the magnetic clutch 18 and starts rotation of the beam B. After a partial rotation of the beam B, the handle 41 may be released to permit the finger 42 to contact with the cam disk 43; and rotation of the beam B will then continue until the finger 42 drops into the next indented portion 45 in the cam 43 which opens the switch in the box 36. Thereupon the handle 30 may be operated to move the shoe 27 to lock the beam B and at the same time open the switch in the box 37. The unfinished tire, which, by rotation of the beam B through 180 degrees, has been brought to position adjacent to the calender G, can now be moved and held in frictional contact with the roll 52 by the air under pressure. It will be seen that both switches in the boxes 36 and 37 must be closed to complete the circuit to the magnetic clutch 18, and that the auxiliary switch in box 37 is automatically closed when the handle 30 is operated to unlock the beam B.

What I claim is:

1. The combination with a calender for forming a strip of material, of mechanism for winding the strip therefrom upon tire rims comprising, means adapted to support a plurality of rims for rotational movement thereon, said means being operable to revolve the rims about a common horizontal axis to successively effect rotation of each rim through movement of a roll of the calender.

2. The combination with a calender for forming a strip of material, of mechanism for winding the strip therefrom upon tire rims through movement of one of the calender rolls comprising, means adapted to support a plurality of rims for rotational movement thereon, said means being operable to revolve the rims about a common horizontal axis to successively position each rim for rotation by a roll of the calender, and means operable to adjust each rim relative to the first means to effect a driving relation between the rim and the roll.

3. The combination with a calender for forming a strip of material, of mechanism for winding the strip therefrom upon tire rim through movement of one of the calender rolls comprising, means adapted to support a plurality of rims for rotational movement thereon, said means being operable to revolve the rims about a common horizontal axis to successively position each rim for rotation by a roll of the calender, and means operable to effect a yieldable driving relation between the rim and the roll.

4. The combination with a calender for forming a strip of material, of mechanism for winding the strip therefrom upon tire rims through movement of one of the calender rolls comprising, means adapted to support a plurality of rims for rotational movement thereon, said means being operable to revolve the rims about a common horizontal axis to successively position each rim for rotation by a roll of the calender, and pressure actuated means operable to adjust each rim relative to the first means to effect a driving relation between the rim and the roll.

5. The combination with a calender for forming a strip of material, of mechanism for winding the strip therefrom upon tire rims comprising, means adapted to support a plurality of rims for rotational movement thereon, said means being operable to revolve the rims about a common horizontal axis to successively effect rotation of each rim through movement of a roll of the calender, and means adapted to automatically lock said first means.

6. The combination with a calender for forming a strip of material, of mechanism for winding the strip therefrom upon tire rims through movement of one of the calender rolls comprising, means adapted to support a plurality of rims for rotational movement thereon, said means being operable to revolve the rims about a common horizontal axis to successively position each rim for rotation by a roll of the calender, means operable to adjust each rim relative to the first means to effect a driving relation between the rim and the roll, and means adapted to automatically lock said first means.

7. The combination with a calender for forming a strip of material, of mechanism for winding the strip therefrom upon tire rims through movement of one of the calender rolls comprising, means adapted to support a plurality of rims for rotational movement thereon, said means being operable to revolve the rims about a common horizontal axis to successively position each rim for rotation by a roll of the calender, means operable to effect a yieldable driving relation between the rim and the roll, and electro-magnetic means for operating said first means.

8. The combination with a calender adapted to form a strip of material, of an adjustably mounted support, electro-magnetic means for operating said support, locking means for said support, a switch connected to said electro-magnetic means and automatically operated through operation of said locking means, a chuck movably mounted on said support and adapted to carry an unfinished tire, and means to operate the chuck to move the unfinished tire into frictional contact with a roll of said calender to rotate the unfinished tire and wind the strip of material from the calender onto the unfinished tire to form a tread portion on the tire.

9. The combination with a calender adapted to form a strip of material, of a rotatably mounted support, electro-magnetic means for revolving said support, locking means for said support, a switch connected to said electro-magnetic means and automatically operated through operation of said locking means, and a chuck mounted on said support and adapted to hold an unfinished tire in frictional contact with a roll of said calender to rotate the unfinished tire and wind the strip of material from the calender onto the unfinished tire to form a tread portion on the tire.

10. The combination with a calender adapted to form a strip of material, of an adjustably mounted support, electro-magnetic means for operating said support, a chuck adapted to carry an unfinished tire, means to actuate the chuck to hold the unfinished tire in frictional contact with a roll of said calender to rotate the unfinished tire and wind the strip of material from the calender onto the unfinished tire to form a tread portion on the tire, a switch connected to said electro-magnetic means, and cam actuated means for controlling the operation of said switch.

11. The combination with a calender adapted to form a strip of material, of a shaft, a support mounted on said shaft, electro-magnetic means for operating said shaft, a chuck mounted on said support and adapted to carry an unfinished tire, means to actuate the chuck to hold the unfinished tire in frictional contact with a roll of said calender to rotate the unfinishd tire and wind the strip of material from the calender onto the unfinished tire to form the tread portion of the tire, a switch connected to said electro-magnetic means, a cam disk on said shaft, and a pivotally mounted lever operatively connected to said cam disk and to said switch.

12. The combination with a calender adapted to form a strip of material, of a shaft, a support mounted on said shaft, electro-magnetic means for operating said shaft, a chuck mounted on said support and adapted to carry an unfinished tire, means to actuate the chuck to move the unfinished tire into frictional contact with a roll of said calender to rotate the unfinished tire and wind the strip of material from the calender onto the unfinished tire to form a tread portion on the tire, a switch connected to said electro-magnetic means, a cam disk mounted on said shaft, a pivotally mounted lever operatively connected to said cam disk and to said switch, locking means for said support, and an auxiliary switch connected to said electro-magnetic means, and automatically operated through operation of said locking means.

In witness whereof, I have hereunto signed my name in the presence of two subscribing witnesses.

ROBERT W. SNYDER.

Witnesses:
R. S. TROGNER,
L. M. HARTMAN.